United States Patent
Korgaonkar

(10) Patent No.: US 9,301,139 B2
(45) Date of Patent: Mar. 29, 2016

(54) SYSTEM AND METHOD FOR MULTIFACTOR AUTHENTICATION AND LOGIN THROUGH SMART WRIST WATCH USING NEAR FIELD COMMUNICATION

(71) Applicant: Prathamesh Anand Korgaonkar, Nasik (IN)

(72) Inventor: Prathamesh Anand Korgaonkar, Nasik (IN)

( * ) Notice: Subject to any disclaimer, the term of this patent is extended or adjusted under 35 U.S.C. 154(b) by 9 days.

(21) Appl. No.: 14/057,096

(22) Filed: Oct. 18, 2013

(65) Prior Publication Data
US 2014/0337956 A1    Nov. 13, 2014

(30) Foreign Application Priority Data

Aug. 16, 2013  (IN) .......................... 1659/MUM/2013

(51) Int. Cl.
   *G06F 17/30*    (2006.01)
   *H04W 12/06*    (2009.01)
   *H04L 29/06*    (2006.01)

(52) U.S. Cl.
   CPC ........... *H04W 12/06* (2013.01); *H04L 63/0853* (2013.01); *H04L 2463/082* (2013.01)

(58) Field of Classification Search
   None
   See application file for complete search history.

(56) References Cited

U.S. PATENT DOCUMENTS

| | | | | |
|---|---|---|---|---|
| 8,438,631 B1* | 5/2013 | Taylor | ................ | G06F 21/6236 726/15 |
| 2009/0033984 A1* | 2/2009 | Sahashi | ................ | G06F 21/608 358/1.15 |
| 2010/0161434 A1* | 6/2010 | Herwig | ................ | G06Q 20/201 705/20 |
| 2012/0069132 A1* | 3/2012 | Kato | ................ | H04L 12/1827 348/14.02 |
| 2012/0137128 A1* | 5/2012 | Buer | ................ | H04L 9/3271 713/156 |
| 2012/0238206 A1* | 9/2012 | Singh | ................ | H04L 63/0492 455/41.1 |
| 2013/0127980 A1* | 5/2013 | Haddick | ................ | G06F 3/013 348/14.08 |
| 2013/0244615 A1* | 9/2013 | Miller | ................ | H04W 12/06 455/411 |
| 2014/0120905 A1* | 5/2014 | Kim | ................ | G07C 9/00857 455/426.1 |
| 2014/0248853 A1* | 9/2014 | Shipley | ................ | H04W 12/06 455/411 |
| 2015/0019892 A1* | 1/2015 | Agrawal | ................ | H04B 5/0031 713/323 |

* cited by examiner

Primary Examiner — Kenny Lin

(57) ABSTRACT

A system and method for multifactor authentication and login using a smart wrist watch with at least one NFC (Near Field Communication) technology tag, with a computing device such as mobile, pda, tablets, laptop, desktop, or any similar system comprising user Authentication NFC login support and multifactor login support system or website wherein at least one NFC tag id arrayed in Smart Wrist watch is used for said device system or said website already registered at the time of sign up or setting user name and password is treated as second authentication factor.

8 Claims, 5 Drawing Sheets

SYSTEM AND METHOD FOR MULTIFACTOR AUTHENTICATION AND LOGIN THROUGH SMART WRIST WATCH USING NEAR FIELD COMMUNICATION

FILED OF INVENTION

The present invention relates generally to authentication, and more specifically to multifactor authentication through apparatus, systems and methods for identification, in particular, apparatus, systems and methods for identifying an entity for computer and/or network security, secure authorization of a payment or for funds transfer and for selectively granting privileges and providing other services in response to such identifications/authentications.

BACKGROUND

Computer systems typically "authenticate" users prior to allowing access. For example, a desktop computer may authenticate a user with a username and password. When the user provides the correct username and password, the user is "authenticated" and is allowed access to computer resources.

Authentication remains a persistent technical problem in the information technology industry. With the proliferation of untrusted applications and untrusted networks, and the increasing use of the Internet for business functions, the authentication issues have become prominent. Authentication refers to a process by which a user makes his or her identity known to a system or application which the user is attempting to access, and occasionally, also the process by which the user verifies the identity of the system being accessed. A common authentication technique involves the use of a shared username and password combination. This style of authentication is vulnerable to a number of Weaknesses. For example, passwords must be made long enough to be secure while being short enough to be memorable. Additionally, the loss of the password is sufficient to allow an attacker to gain access to the system by impersonating the user. Therefore, additional authentication techniques would find utility.

"Multifactor authentication" generally refers to a security authentication system in which more than one form of authentication is used to validate the identity of a user. For example, a webpage which asks a user to remit a single user name/password combination may be considered a "single-factor" authentication system since it requests a single datum-a username/password combination-in order to validate a user's identity. The webpage may add additional procedures, such as sending a confirmation email to the user's verified email address or matching security code(s) or user device id using Near Field Communication (NFC) tag enabled devices, in order to add additional levels of user authentication, thereby implementing a "multifactor authentication" system for the webpage as well as any computing system.

PRIOR ART

Banks, financial institutions and Social networking websites implement single factor authentication systems for online access to user accounts. In the field of computing, a user may be required to input confidential information on a system for different reasons. In one example, the user may be required to type in a username and password when initially logging into a computer or computer network. In another example, the user may have to manually provide a username and password when logging into certain websites on the system. In yet another example, the user may be required to provide credit card information when shopping online on the system.

In the above examples, the inputting of authentication information can be inconvenient for the user and insecure for the system. Thus, it may be beneficial to lessen user burden and increase system security when authenticating a user on a system. Now a days use system and website is getting personal as well as private to prevent data or access of system from third party or unauthorized user. For such user authentication is required to identify exact user and providing respective access rights to the system or data or websites. Websites such as banking websites or social networking sites requires authentication and login process much more stronger as the data in such a sites is very sensitive and could harm severe side effect such as losing control over user account or misusing the user's personal data. The traditional authentication and login system comprising of username and password having alphanumeric character which is chosen by user itself. In such a process user has to input in the system manually by typing or entering to the system or website. The input is compared with predefined and stored data by user and if matches user is authenticated and allowed to login to system or website. But dumpster diving (getting user credential from dumps or trash), shoulder surfing (watching user while entering credential data) such kinds of attack can crack this security easily and get access to user account information. More so, for multi factor authentication cellular and smart phones can be bulky to carry and it is not always possible to have them readily available to use them as additional authentication level in a multifactor authentication set up. With the advent of mobile internet, mobile phones itself are used as computing device for accessing websites. Thus It is desirable and be convenient to have a device to be secured to a user and easily accessible at all times like a wrist watch. Use of NFC technology in such wrist watches will act as secure and error free user authentication and login in cutting edge age of technology.

From the foregoing it is appreciated that there exists a need for device and method to ameliorate the shortcomings of existing devices and practices used for authentication of users and login to a system or website. Thus there should be multifactor authentication system comprising user input (username and password) as well as user's device id or security code which belongs to user personal device which will be treated as second authenticating factor.

SUMMARY OF THE INVENTION

The present invention relates generally to user authentication and login, more specifically, to a multifactor authentication system and process and login to a system or website using Near field communication. The invention in particular relates to a multi factor authentication system and process and login to a system or website using wrist watch enabled with Near Field Communication tag. The present invention further includes a wrist watch comprising of at least one unique NFC tag id for a system or website already registered at the time of sign up or setting user name and password which is treated as second authentication factor. In one embodiment of the invention, wrist watch may be enabled with multi NFC tag which will be treated as single device for multiple websites including personal computing device/system such as laptop, mobile or tablet etc.

OBJECTIVES OF THE INVENTION

The main objective of the invention is to address the problems cited in the prior art and to provide multi factor authentication system and process and login using wrist watch enabled with at least one Near field communication tag.

Another objective of the invention is to lessen user burden and increase system security when authenticating a user on a system. Further objective of the invention is to protect misuse of user account information from cyber fishing and hacking threats.

Yet another objective of the invention is to provide a hassle free and convenient device such as a wrist watch with NFC tag to provide secure user authentication medium.

The problems of the prior art can be eliminated by employing the present invention. The system for multi factor authentication and login comprising of: a wrist watch with at least one NFC Tag; a computing device (mobile, pda, tablets, laptop, desktop, or any system comprising user Authentication NFC login support), multifactor login support system or website wherein at least one NFC tag id for said device system or said website already registered at the time of sign up or setting user name and password is treated as second authentication factor.

ADVANTAGES OF THE INVENTION

The use of wrist watch enabled with NFC tag in the present invention is easy to carry.

Ease of disabling NFC tag or making it no readable in case the wrist watch/device is lost by the user.

Multiuse of wrist watch as time showing device and authenticating factor.

Wristwatch NFC tag can be disabled from reading when it is not used for authentication. i.e. login and time mode may be enabled in wristwatch.

The details of one or more implementations are set forth in the accompanying drawings and the description below. Other features and advantages will be apparent from the description, drawings, and from the claims.

DETAILED DESCRIPTION OF DRAWINGS

Figure 1:
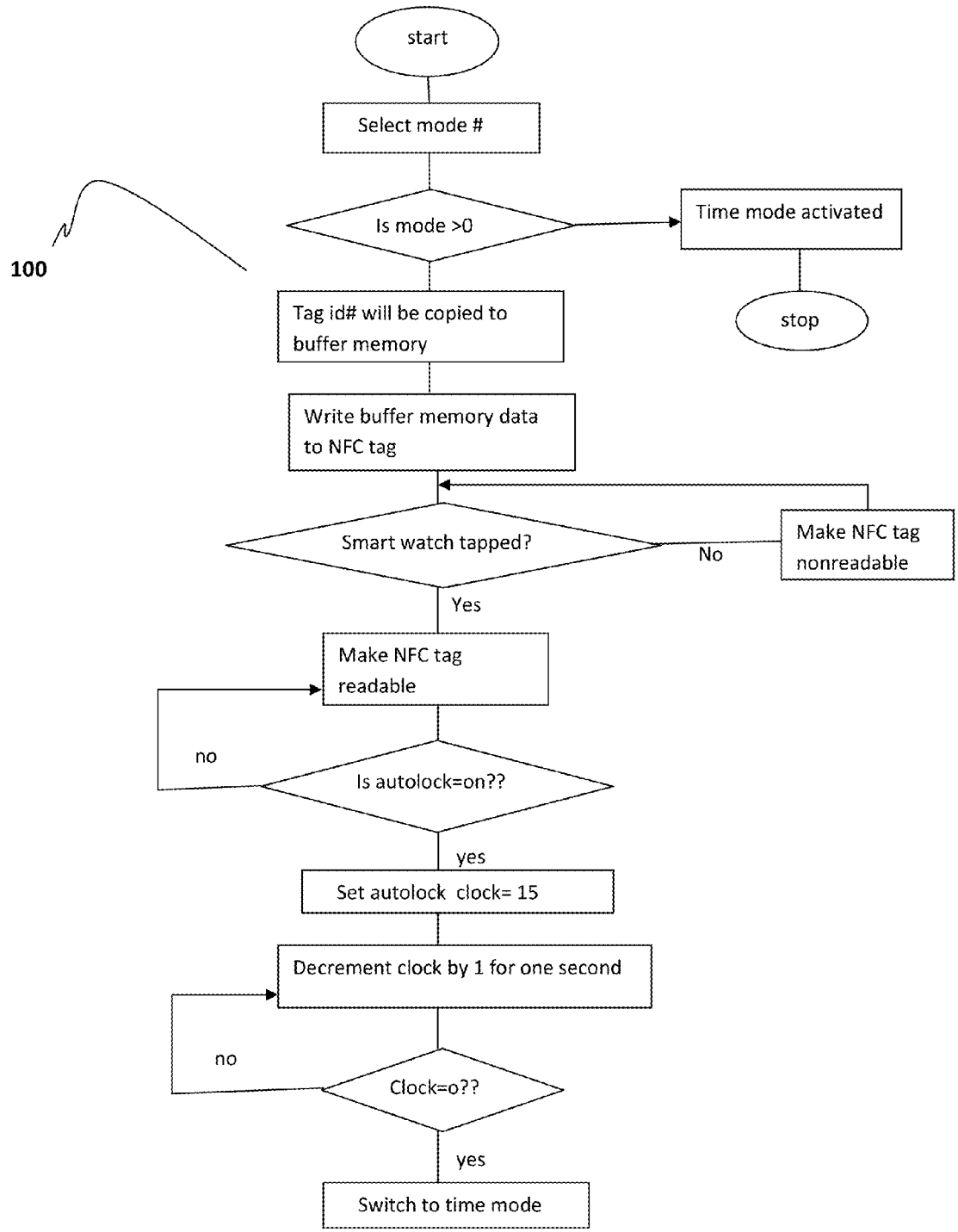
FIG. 1. is the flow chart for activation of NFC login mode in the smart wrist watch.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
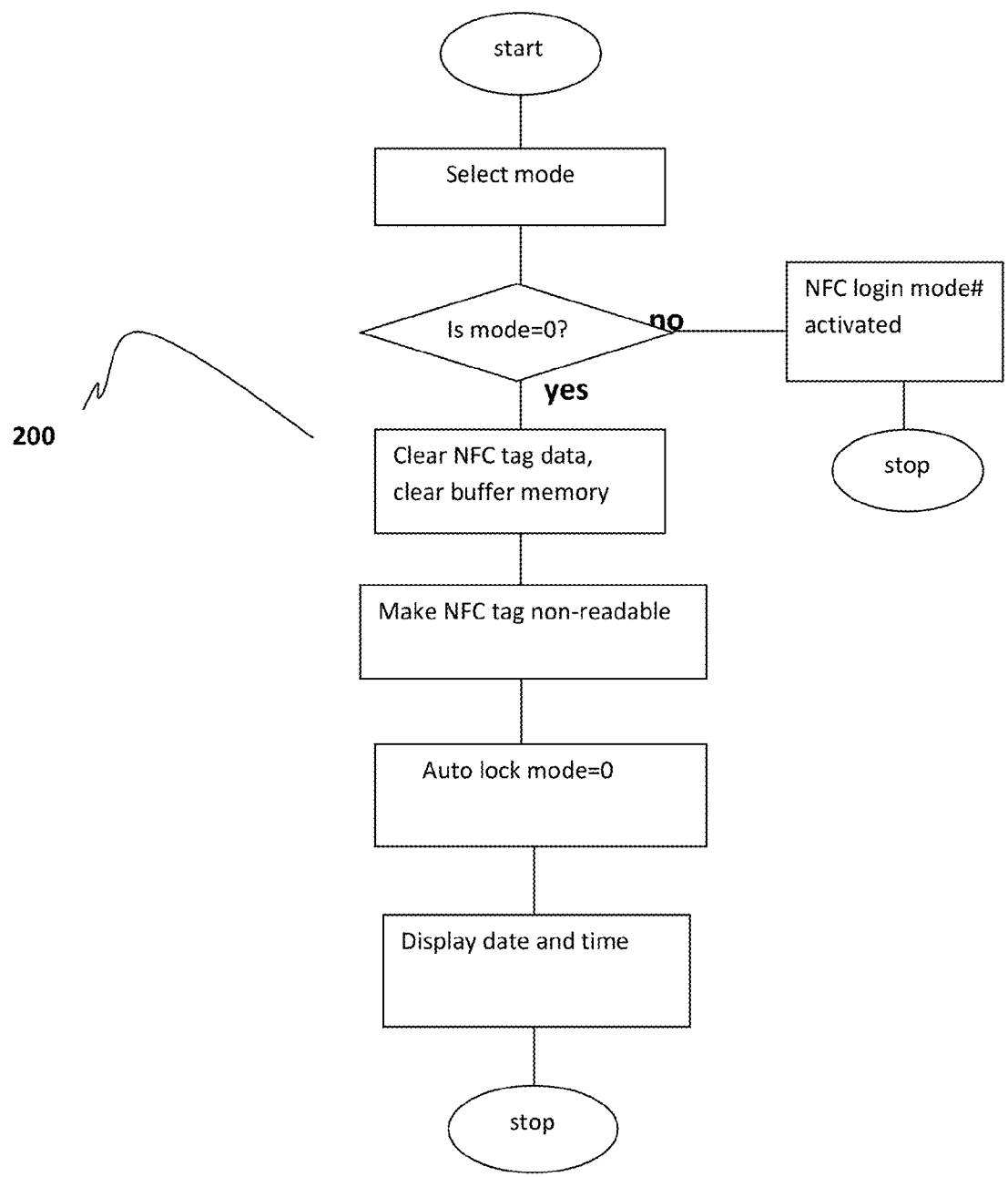
FIG. 2. is the flow chart for activation of Time mode and disabling the NFC mode.
Figure 4:
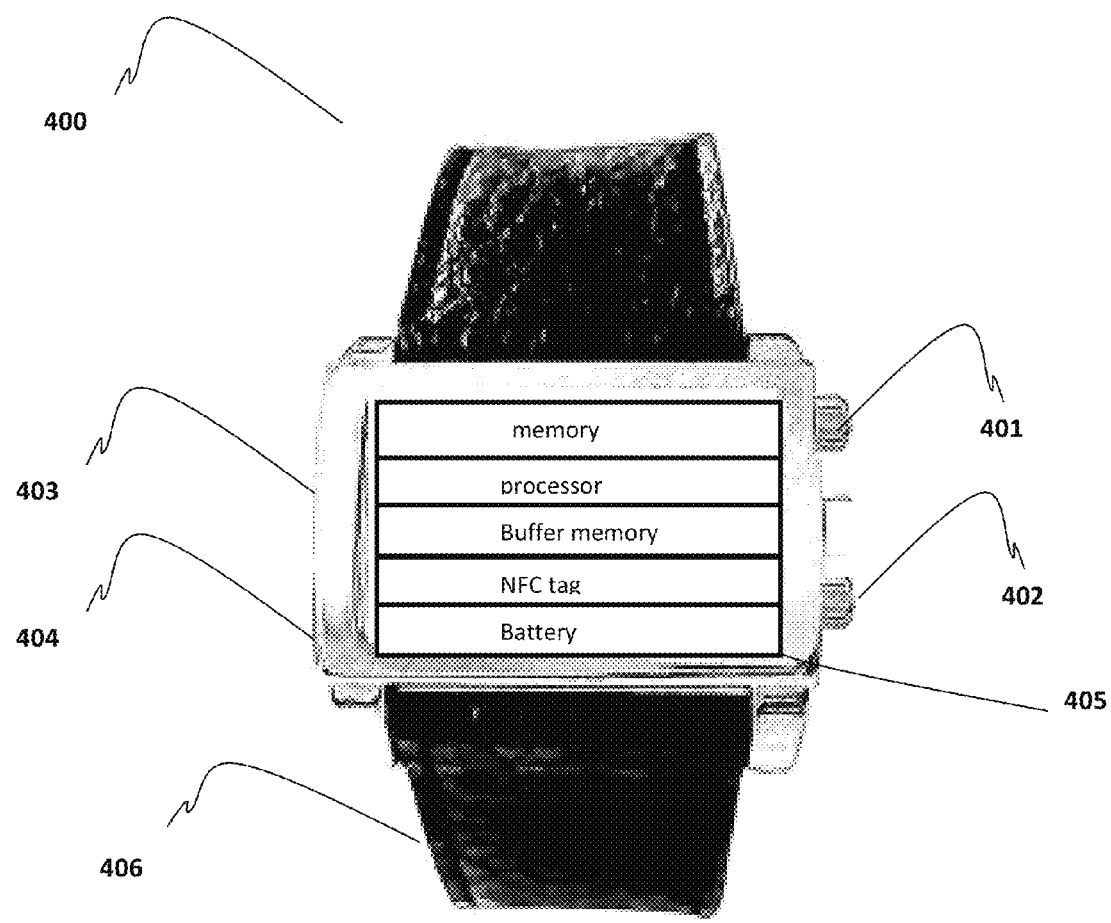
FIG. 4. shows the smart watch

FIG. 1. 100 and FIG. 2 200 are the flow charts for activation of NFC login mode in the smart wrist watch by default the smart wrist watch will be in Time Mode and pressing the mode button 401 in FIG. 4 the smart wrist watch prompts the user to select the mode. In case user select the NFC Mode, NFC Mode is activated and prompts for selection of Tag id, on selecting the tag id the tag id will be copied to the buffer memory and write buffer memory with data in the tag id to NFC tag, if smart wrist watch is tapped to a computing device it makes NFC tag readable otherwise-NFC tag becomes non-readable. On NFC tag becoming readable the auto lock activates and within 15 seconds if the user does not tap for authentication it takes back to the time mode.

Figure 3:
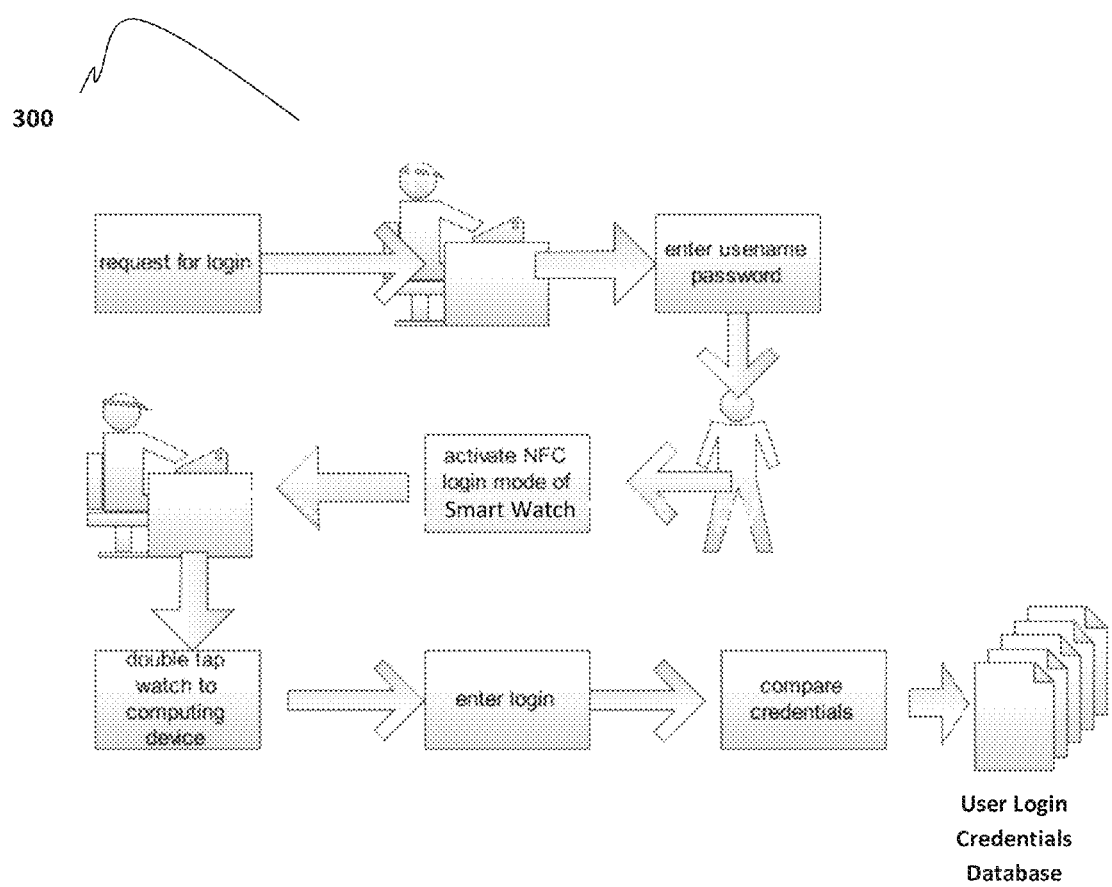
FIG. 3. shows the login process and authentication

FIG. 3 300 is the process followed in authentication using the smart wrist watch the user request for login enters user name and password, activates NFC login mode of smart wrist watch and double tap the smart wrist watch to computing device, enters the login the computing device compares the credentials and provides access or deny the access.

FIG. 4 400 is the smart wrist watch 401 is the mode button to select time mode or NFC mode 402 is the select button, 403 is the settings button and 404 is changes the settings, 405 is smart wrist watch screen and 406 is wrist watch band.

Figure 5:
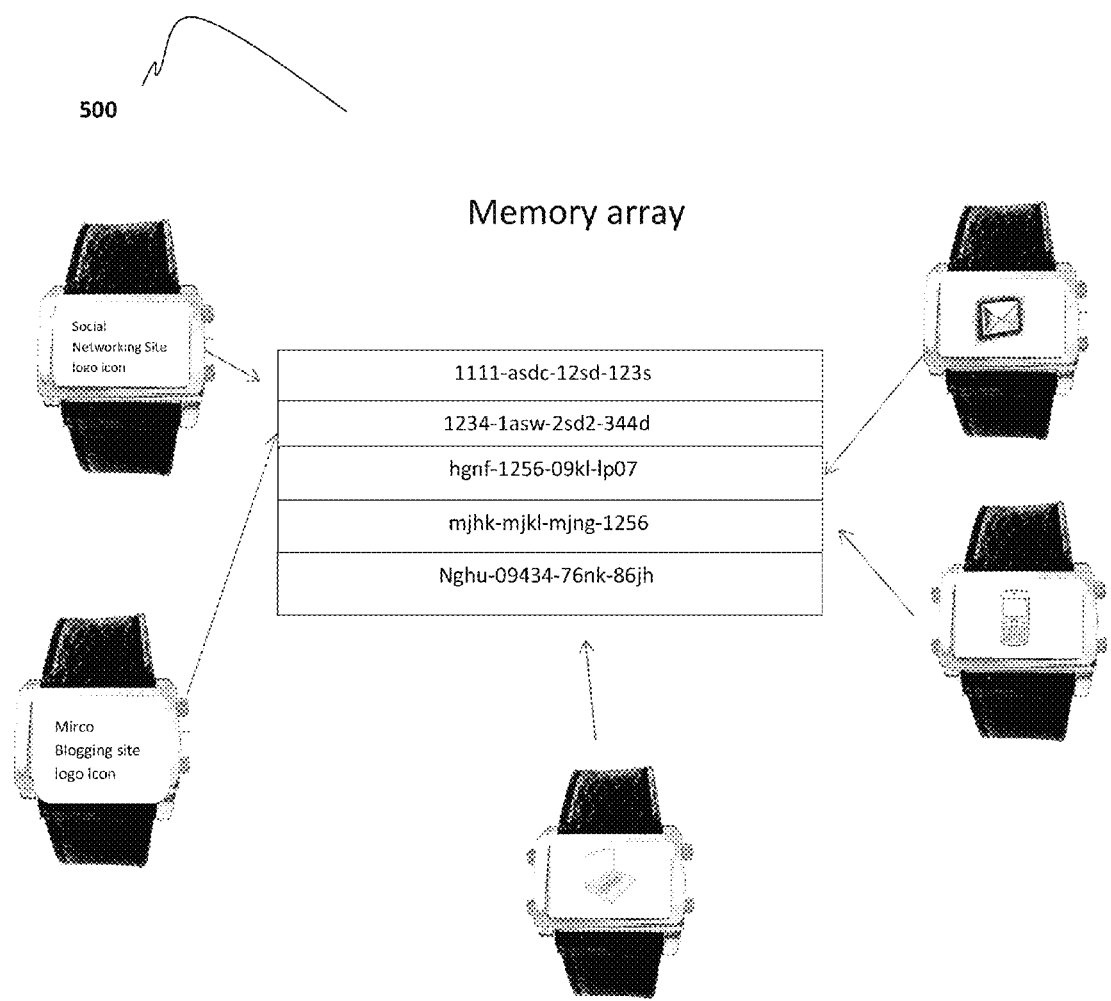
FIG. 5. shows the memory array in the Smart wristwatch.

FIG. 5 500 shows the memory array of various modes assigned with tag ids such as 501 is for social networking site login, 502 for micro blogging login, 503 for computer database login, 504 for email messages login, and 505 for login into the mobile system etc.

DETAILED DESCRIPTION OF THE INVENTION

In one embodiment of the invention, the smart wrist watch may be enabled with multi NFC tag which will be treated as single device for multiple websites including personal computing device/system such as laptop, mobile or tablet etc.

The method for multifactor authentication and signup includes the steps of:

signing up process on a computing device enabled with NFC login support;

entering the user name or email id and password on the said computing device;

entering either the device id which is printed on the back side of the smart wristwatch or the mobile number as security id of the user or both.

taping the wrist watch enabled with at least one NFC tag having distinct tag ID to the said computing device;

sending of said tag ID to the said computing device/system;

storing user credential including tag id, username and password;

completion of signing up as user account and creation of user account;

sending of confirmation along with user credential information including device id to user through email/sms/or phone call.

The method for multifactor authentication and login includes the steps of:

signing up process on a computing device enabled with NFC login support;

entering the user name or email id and password on the said computing device;

taping the wrist watch enabled with at least one NFC tag having distinct tag Id to the said computing device;

reading said tag id using NFC technology by the said computing device;

pressing or clicking the input button to the said computing device;

matching of user credentials for authentication from the stored user account information;

sending NFC login notification including login time info through email/sms./phone call;

completion of user identification to enable login to the said device

The method for multifactor authentication and logout includes the steps of:

double tapping the wrist watch enabled with at least one NFC tag to the computing device;

pressing the logout key;

sending logout notification along with time and said NFC tag id;

completion of logout.

The said multifactor authentication includes one tap authentication mode and/or custom authentication mode. The said NFC login mode may be disabled by the user in case the wrist watch enabled with NFC tag is lost by the user.

The method for disabling multifactor authentication and login includes the steps of:

Clicking on device lost icon displayed on the said website/computing device;

Sending of verification code to user email account or mobile phone through mail/sms or phone call;

Entering said verification code along with username and password;

Disabling NFC login or reset login for the said user account for said website;

Seeking new device or single authentication mode

The smart wrist watch can be functioned with different modes as follows:

Time Mode:—It would be the default mode in the smart wrist watch, in which mode the date and time will be displayed, the buffer memory would be empty and NFC (Near Field Communication) tag is disabled and is non readable state as such inactive.

NFC Login Mode:—In this mode there are different tag id are pre-loaded in the smart wrist watch. by pressing the mode selection button it can navigate through each tag id and display tag id logo on the screen and the buffer memory is copied with such tag id and will be ready to function as Near Field Communication on tapping the same to the computing device. The NFC Login mode will have default auto locking after 15 seconds and the auto lock counter start decrementing by 1 for every 1 second and NFC login mode will be disabled on completion of 15 seconds and reverts to Time Mode when wrist watch is tapped.

The smart wrist watch which comprises of the scratch proof display having internal non volatile memory with pre defined stored data as tag ids, mode icon in an array format along with the processor to read, write, copy, delete and change mode operations, display mode icon, display date and time. The smart wrist watch also consists of a rechargeable battery and a non volatile memory for storing temporary data along with an operating system to support these various operations.

By default the smart wrist watch will be in Time Mode and pressing the mode button 401 in FIG. 4 the smart wrist watch prompts the user to select the mode. In case user select the NFC Mode, NFC Mode is activated and prompts for selection of Tag id from the array of Tag Id's displayed by relative icon on the smart wrist watch screen, on selecting the tag id the tag id will be copied to the buffer memory and write buffer memory with data in the tag id to NFC tag, if smart wrist watch is tapped to a computing device it makes NFC tag readable and otherwise NFC tag becomes non-readable. On NFC tag becoming readable the auto lock activates and within 15 seconds if the user does not tap for authentication it takes back to the time mode.

During NFC mode activated if the user select particular tag id from the array of tag ids displayed on the smart wrist watch, an icon will be displayed of the tag id selected Ex:—icon of a social networking portal, email icon or other database icon or authentication website icon and the smart Wrist Watch will copy the selected tag id to buffer memory and processor will write buffer memory data that is selected tag id to NFC tag. On tapping of smart Wrist watch to computing device in this mode, NFC tag will be readable to computing device and it will read the selected from NFC tag id and proceed for authentication process of the selected tag id.

Reference in the specification to "One embodiment" or "an embodiment" means that a particular feature, structure, or characteristic described in connection with that embodiment may be included in at least an implementation. The appearance of the phrase "in one embodiment" in various places in the specification may or may not be all referring to the same embodiment.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of performing multifactor authentication of a user for accessing a resource, comprising the steps of:
    a. associating the user with registration information particulars of the user, the said registration information includes a first factor authentication information, wherein the first factor authentication information includes user identifier and password;
    b. activating a Near Field Communication (NFC) mode in a smart wrist watch and allowing the user to select a required NFC tag identifier in an array of NFC tag identifiers on the smart wrist watch from the activation of NFC mode, wherein each of the NFC tag identifier is associated with a corresponding NFC tag;
    c. associating an account of the user with the smart wrist watch using near field communication by tapping the smart wrist watch to a computing device for further authentication and access to the selected tag identifier on the smart wrist watch if the required NFC tag identifier is selected; and
    d. disabling the NFC mode by switching to a time mode in the smart wrist watch after fifteen seconds when the NFC tag identifier is selected to prevent unauthorized use of the activated NFC mode;
    wherein the time mode displays time and date on the smart wrist watch and place the NFC tag inactive.

2. The method of claim 1, further comprising the step of allowing the user to remotely disabling the multifactor authentication and login when the smart wrist watch is lost.

3. The method of claim 1, wherein the NFC tag is for authenticating a corresponding resource selected from one of the following group of: social networking sites, email accounts, bank accounts, remote computer, laptop, desktop, tablet, mobile phone, ipods and memory devices.

4. The method of claim 2, wherein the remotely disabling the multifactor authentication and login includes the steps of:
    clicking on device lost icon displayed on a website;
    entering the first factor authentication information using an input device to the website;

sending of verification code to user email account or mobile phone through SMS or phone call;

entering said verification code along with username and password of the user;

disabling NFC login or reset login for the account of the user for said website.

5. A non-transitory computer-readable storage medium including an executable program stored thereon, when executed by at least one processor, caused the program to perform multifactor authentication of a user for accessing a resource, comprising the steps of:

a. associating the user with registration information particulars of the user, the said registration information includes a first factor authentication information, wherein the first factor authentication information includes user identifier and password;

b. activating a Near Field Communication (NFC) mode in a smart wrist watch and allowing the user to select a required NFC tag identifier in an array of NFC tag identifiers on the smart wrist watch from the activation of NFC mode, wherein each of the NFC tag identifier is associated with a corresponding NFC tag;

c. associating an account of the user with the smart wrist watch using near field communication by tapping the smart wrist watch to a computing device for further authentication and access to the selected tag identifier on the smart wrist watch if the required NFC tag identifier is selected; and d. disabling the NFC mode by switching to a time mode in the smart wrist watch after fifteen seconds when the NFC tag identifier is selected within the fifteen second to prevent unauthorized use of the activated NFC mode;

wherein the time mode displays time and date on the smart wrist watch and place the NFC tag inactive.

6. The non-transitory computer-readable storage medium of claim 5, wherein the program, when executed by the at least one processor, further performing the step of allowing the user to remotely disabling the multifactor authentication and login when the smart wrist watch is lost.

7. The non-transitory computer-readable storage medium of claim 5, wherein the NFC tag is for authenticating a corresponding resource selected from one of the following group of: social networking sites, email accounts, bank accounts, remote computer, laptop, desktop, tablet, mobile phone, ipods and memory devices.

8. The non-transitory computer-readable storage medium of claim 6, wherein the step of allowing the user to remotely disabling the multifactor authentication and login further comprises the steps of:

clicking on device lost icon displayed on a website;

entering the first factor authentication information using an input device to the website;

sending of verification code to user email account or mobile phone through SMS or phone call;

entering said verification code along with username and password of the user;

disabling NFC login or reset login for the account of the user for said website.

\* \* \* \* \*